United States Patent
Heidebrecht et al.

(10) Patent No.: US 10,615,459 B2
(45) Date of Patent: Apr. 7, 2020

(54) DEVICE FOR STORING ELECTRICAL ENERGY AND METHOD FOR OPERATING THE DEVICE

(71) Applicant: BASF SE, Ludwigshafen am Rhein (DE)

(72) Inventors: Peter Heidebrecht, Ludwigshafen (DE); Domnik Bayer, Ludwigshafen (DE); Wolfgang Jabczynski, Ludwigshafen (DE); Jesus Enrique Zerpa Unda, Ludwigshafen (DE); Anna Katharina Duerr, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 29 days.

(21) Appl. No.: 16/081,985

(22) PCT Filed: Mar. 3, 2017

(86) PCT No.: PCT/EP2017/055067
§ 371 (c)(1),
(2) Date: Sep. 4, 2018

(87) PCT Pub. No.: WO2017/153292
PCT Pub. Date: Sep. 14, 2017

(65) Prior Publication Data
US 2019/0089014 A1    Mar. 21, 2019

(30) Foreign Application Priority Data
Mar. 8, 2016 (EP) .................................. 16159091

(51) Int. Cl.
*H01M 4/02* (2006.01)
*H01M 10/39* (2006.01)
(Continued)

(52) U.S. Cl.
CPC ..... *H01M 10/3954* (2013.01); *H01M 10/052* (2013.01); *H01M 10/44* (2013.01); *H01M 10/613* (2015.04); *H01M 10/615* (2015.04)

(58) Field of Classification Search
CPC ...................................................... H01M 4/02
See application file for complete search history.

(56) References Cited

U.S. PATENT DOCUMENTS

| | | |
|---|---|---|
| 4,086,393 A | 4/1978 | Hart |
| 4,728,587 A | 3/1988 | Horie et al. |
| 2012/0040262 A1* | 2/2012 | Ubler et al. ............ H01M 4/02 429/122 |

FOREIGN PATENT DOCUMENTS

| | | |
|---|---|---|
| DE | 2610222 A1 | 10/1976 |
| DE | 2635900 A1 | 5/1977 |

(Continued)

OTHER PUBLICATIONS

International Search Report and Written Opinion issued in International Patent Application No. PCT/EP2017/055067 dated Apr. 10, 2017, and English translation. 16 pages.

(Continued)

*Primary Examiner* — Jacob B Marks
(74) *Attorney, Agent, or Firm* — Armstrong Teasdale LLP

(57) ABSTRACT

Provided herein is an apparatus for storing electric energy including at least one electrochemical cell having an anode space and a cathode space that are separated by a solid electrolyte, a first store for anode material that is connected to the anode space, and a second store for cathode material that is connected to the cathode space. The cathode space is also connected to a third store. The second and third stores are connected to one another by means of a gas conduit that opens into the upper region of the second and third stores. A conveying apparatus for gas having a reversible convey- (Continued)

Figure 1:
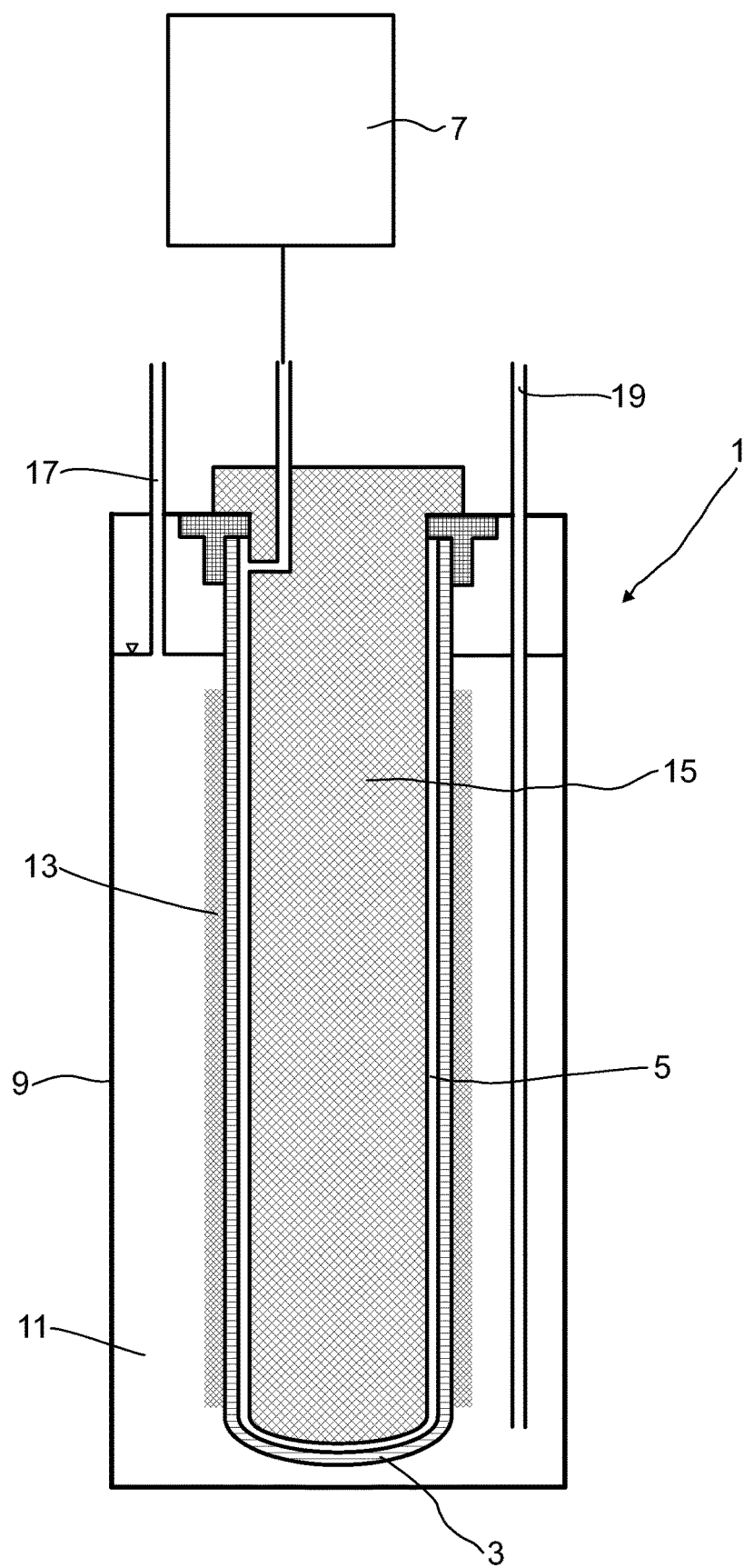

ing direction is accommodated in the gas conduit. Further provided herein is a method of operating the apparatus.

15 Claims, 5 Drawing Sheets

(51) Int. Cl.
*H01M 10/052* (2010.01)
*H01M 10/44* (2006.01)
H01M 10/615 (2014.01)
H01M 10/613 (2014.01)

(56) References Cited

FOREIGN PATENT DOCUMENTS

| | | |
|---|---|---|
| DE | 4029901 A1 | 3/1992 |
| DE | 102011110843 A1 | 2/2013 |
| JP | 2002184456 A1 | 6/2002 |
| JP | 2010212099 A | 9/2010 |
| WO | 2010112466 A1 | 10/2010 |
| WO | 2010135283 A1 | 11/2010 |
| WO | 2011161072 A1 | 12/2011 |
| WO | 2017093386 A1 | 6/2017 |

OTHER PUBLICATIONS

International Preliminary Report on Patentability issued in International Patent Application No. PCT/EP2017/055067, dated Sep. 20, 2018, and English translation. 14 pages.
Co-pending U.S. Appl. No. 16/061,882, filed Jun. 13, 2018.

* cited by examiner

DEVICE FOR STORING ELECTRICAL ENERGY AND METHOD FOR OPERATING THE DEVICE

CROSS-REFERENCE TO RELATED APPLICATIONS

This application is the national stage entry of PCT/EP2017/055067, filed on Mar. 3, 2017, which claims the benefit of priority to European Patent Application No. 16159091.4, filed Mar. 8, 2016, which are incorporated by reference in their entirety herein.

FIELD OF THE INVENTION

The invention proceeds from an apparatus for storing electric energy, which comprises at least one electrochemical cell having an anode space and a cathode space, which are separated by a solid electrolyte, and also a first store for anode material which is connected to the anode space and a second store for cathode material which is connected to the cathode space. The invention further relates to a method of operating the apparatus for storing electric energy.

BACKGROUND

Electrochemical cells which are used for storing electric energy are generally referred to as battery or accumulator. Other electrochemical apparatuses are, for example, electrolysis cells. These can, for example, be used for preparing alkali metals from suitable salts comprising alkali metals.

Apart from batteries which are operated at ambient temperature, there are also ones which require an operating temperature above ambient temperature. These are generally electrochemical cells which operate using molten electrolytes, with the melting point of at least one electrolyte being above ambient temperature. Batteries of this type are, for example, those based on alkali metal and sulfur, with both sulfur and alkali metal being used in the molten state.

Batteries of this type which operate on the basis of a molten alkali metal as anode and a cathodic reaction participant, in general sulfur, are known, for example, from DE-A 26 35 900 or DE-A 26 10 222. Here, the molten alkali metal and the cathodic reaction participant are separated by a solid electrolyte which is permeable to cations. A reaction of the alkali metal with the cathodic reaction participant occurs at the cathode. This is, for example when using sodium as alkali metal and sulfur as cathodic reaction participant, the reaction of sodium and sulfur to form sodium polysulfide. To charge the battery, the sodium polysulfide is dissociated again into sodium and sulfur at the electrode by introduction of electric energy.

To increase the storage capacity of batteries based on a molten alkali metal and a cathodic reaction participant, batteries in which the amount of reactants used is increased by means of additional stock vessels are used. To effect discharge, the liquid sodium is supplied to the solid electrolyte. The liquid sodium serves simultaneously as anode and forms cations which are transported through the cation-conducting solid electrolyte to the cathode. At the cathode, the sulfur flowing onto the cathode is reduced to polysulfide, i.e. reacted with the sodium ions to form sodium polysulfide. The corresponding sodium polysulfide can be collected in a further vessel. As an alternative, it is also possible to collect the sodium polysulfide together with the sulfur in the vessel around the cathode space. Owing to the density difference, the sulfur rises and the sodium polysulfide settles. This density difference can also be utilized to bring about flow along the cathode. A corresponding battery design is described, for example, in WO 2011/161072.

DE-A 10 2011 110 843 discloses a battery based on molten sodium and molten sulfur, in which separate stores for sodium, sulfur and sodium polysulfide are provided and during operation the materials required in each case flow through the cells of the battery. The electrodes for taking off electric power are arranged on the sodium conduit and on the polysulfide conduit.

WO-A 2010/135283 describes a further sodium-sulfur battery in which separate vessels for sodium and sulfur are used in order to increase the range. Here, sodium and sulfur are each conveyed by means of pumps through the respective electrolyte spaces of an electrochemical cell. This results in continuous flow, so that the sodium polysulfide which is formed on the sulfur side is continuously discharged from the electrolyte space.

Since all electrochemical reactants are present in molten form and the optimal conductivity range of the ion-conducting ceramic membrane is attained only at relatively high temperatures, the operating temperature of such a battery is usually in a range from 300° C. to 370° C. The maximum temperature is generally determined by the degradation of the ceramic used as solid electrolyte.

To control the temperature of the cells, JP-A 2010-212099 or DE-A 40 29 901 disclose, for example, use of a temperature-control medium which flows around the electrochemical cells.

However, all these systems have the disadvantage that when a plurality of cells are joined to form a battery, no heat can be conducted away outward from the electrochemical cells located in the interior, as a result of which the cells located in the interior become significantly warmer than those located on the outside. This can frequently make a shutdown or throttling back of the power necessary during ongoing operation, which adversely affects the economics of the battery. In addition, heating and cooling of such a battery, for example for shutting it down or starting it up again, is possible with only very moderate temperature gradients over time and thus a large expenditure of time.

A further disadvantage of the batteries known from the prior art is that conveying apparatuses, in general pumps, which are in direct contact with the liquid sulfur or the liquid alkali metal have to be used for conveying the sulfur and the alkali metal. This leads to high corrosion rates and thus to frequent shutdown of the battery because of the necessary servicing and maintenance work.

It is therefore an object of the present invention to provide an apparatus for storing electric energy having at least one electrochemical cell and also a method of operating such an apparatus, which do not have the disadvantages known from the prior art.

DESCRIPTION

The object is achieved by an apparatus for storing electric energy, which comprises at least one electrochemical cell having an anode space and a cathode space, which are separated by a solid electrolyte, and also a first store for anode material which is connected to the anode space and a second store for cathode material which is connected to the cathode space, wherein the cathode space is also connected to a third store, and the second store and the third store are connected to one another by means of a gas conduit, wherein the gas conduit opens in each case into the upper region of the second store and of the third store and a conveying apparatus for gas having a reversible conveying direction is accommodated in the gas conduit, and, furthermore, (i) the second store has an offtake point in the lower region of the store, which offtake point is connected to a conduit which opens into the upper region of the cathode space, and the third store has an offtake point at the surface of the liquid comprised in the third store, which offtake point is connected to a conduit which opens into the lower region of the cathode space, or (ii) the second store and the third store each have an offtake point in the lower region of the store, which offtake points are connected to a conduit which opens into the lower region of the cathode space, and each have an offtake point at the surface of the liquid comprised in the store, which offtake points are connected to a conduit which opens into the upper region of the cathode space.

The use of the second store and the third store which are connected by the gas conduit makes it possible to transport the cathode material into the cathode space and the reaction product formed in the cathode space from the cathode space into the respective store during discharging, and to transport the reaction product into the cathode space and the cathode material formed in the cathode space into the respective store during charging of the battery, without additionally using a pump which comes into contact with the cathode material or the reaction product. This allows, in particular, interruptions to operation for maintenance work made necessary by corrosion of the pumps due to contact with cathode material or the reaction product formed to be avoided. The transport of cathode material and reaction product through the cathode space is effected merely with the aid of gravity and a pressure difference which is generated by conveying the gas from one store into the other store.

In a particularly preferred embodiment, sulfur is used as cathode material and an alkali metal, in particular sodium, is used as anode material. The reaction product formed is an alkali metal polysulfide, hereinafter also referred to as polysulfide.

Apart from the use of sulfur and alkali metal, the apparatus according to the invention and the method according to the invention can also be used for other cathode materials and anode materials as long as anode material, cathode material and reaction product are liquid at the operating temperature and, in addition, cathode material and reaction product form two immiscible phases having different densities. For reasons of simplicity, both the apparatus and also the method will hereinafter be described for the example of sulfur as cathode material and alkali metal as anode material.

Assistance to the transport of sulfur or alkali metal polysulfide through the cathode space by means of gravity can, for example, be realized when the second store is positioned above the electrochemical cell and the third store is positioned below the electrochemical cell. In this case, the sulfur can flow solely under the action of gravity from the second store through the electrochemical cell into the third store. Since the alkali metal polysulfide has a higher density than sulfur, the alkali metal polysulfide sinks downward when formed in the cathode space and can thus likewise be taken off solely with the aid of gravity and introduced into the third store.

If the flow rate of the sulfur and alkali metal polysulfide from the upper second store through the cathode space into the lower third store is to be increased, the transport of the sulfur can also be assisted here by introduction of gas into the second store and the associated pressure buildup in the second store.

A further advantage of the positioning of the second store above the electrochemical cell and of the third store below the electrochemical cell is that continuous venting is possible. Any gas bubbles occurring in the cathode space or in the conduits rise upward into the second store and thus cannot disrupt the transport of the sulfur in the pipes or block parts of the electrode.

Furthermore, it is possible to push the total liquid, i.e. sulfur and alkali metal polysulfide, both from the second store and also from the cathode space of the electrochemical cell into the third store by increasing the pressure, i.e. by introducing gas to the upper second store, so that the electrochemical cell is also largely emptied. In this way, the risk of rupture of the solid electrolyte during cooling of the battery to a temperature below the solidification temperature of sulfur or of the alkali metal polysulfide, for example for inspection purposes, is significantly reduced. Hazard-free heating when resuming operation is also possible since heating of the sulfur and of the polysulfide occurs in the lower store and only the empty cell has to be heated.

Since the flow direction has to be reversed and the alkali metal polysulfide has to be introduced into the cathode space for charging of the battery, it is necessary, for this operating state, to introduce the gas into the third store so that the alkali metal polysulfide is introduced into the cathode space as a result of the increased pressure and the sulfur can be taken off from the cathode space at the top. The conveying apparatus for gas having a reversible conveying direction is necessary for this purpose.

As conveying apparatus for the gas having a reversible conveying direction, it is possible to use, for example, a compressor unit having a reversible flow direction. Use of such a compressor unit in combination with appropriate shut-off devices, in particular valves or cocks, allows gas to be conveyed either from the second store into the third store or, in the opposite direction, from the third store into the second store. In this way, the pressure in the store into which the gas is conveyed is increased and the pressure in the other store from which the gas is taken off is reduced. As an alternative to a compressor unit having a reversible flow direction, the reversible conveying direction can also be realized in any other desired way known to those skilled in the art. Thus, for example, it is possible to provide two parallel conduits which each have a conveying apparatus, with one conveying apparatus conveying in the one direction and the second conveying apparatus conveying in the opposite direction, and to convey the gas by means of valves, in each case depending on the desired direction, through one of the two conduits. As conveying apparatus, it is possible to use any desired apparatus by means of which gas transport can be effected. Customary conveying apparatuses are compressors.

To prevent sulfur from condensing in the compressors used for conveying gas, a condensate separator is, in a preferred embodiment, positioned between the second store and the conveying apparatus for gas and/or between the third store and the conveying apparatus for gas. The condensate separator preferably operates at a temperature at which sulfur comprised in the gas condenses out and can be separated off. The precipitation of the sulfur comprised in the gas is necessary particularly when the conveying apparatus for the gas is operated at a temperature which is below the condensation temperature of sulfur. In this case, sulfur comprised in the gas can condense out in the conveying apparatus and lead to damage, in particular as a result of corrosion. To ensure that no sulfur gets into the conveying apparatus, the condensate separator is preferably positioned upstream of the conveying apparatus in the flow direction of the gas.

The low temperature desired for precipitation of the sulfur can, on the one hand, be achieved by cooling of the condensate separator but, as an alternative, it is also possible to position the condensate separator in a place at which the temperature is lower than the operating temperature of the battery. Such a place is, for example, outside the insulation necessary for operation of the battery.

As an alternative to or in addition to a condensate separator, it is also possible to provide a bellows between the second store and the conveying apparatus for the gas and between the third store and the conveying apparatus for the gas. The use of the bellows makes it possible to decouple the gas transported by the conveying apparatus completely from the respective gas atmosphere comprised in the second store and third store.

Since it is not possible to prevent sulfur or polysulfide from being comprised at least in part of the conduits used for gas transport and both sulfur and polysulfide have a corrosive action, the conduits are preferably provided with suitable corrosion protection. For this purpose, it is possible, for example, to chromate the conduits.

In one embodiment of the invention, the second store and the third store each have an offtake point in the lower region of the store, which offtake points are connected to a conduit which opens into the lower region of the cathode space, and each have an offtake point at the surface of the liquid comprised in the store, which offtake points are connected to a conduit which opens into the upper region of the cathode space, and the second store and third store are connected to one another in such a way that liquid from the second store can be conveyed directly into the third store. This connection between the second and third stores allows polysulfide which has not been reacted during charging of the battery and sulfur which has not been reacted during discharging of the battery to be conveyed directly back into the store again, from which store the polysulfide and the sulfur are respectively introduced into the cathode space in order to allow continuous operation of the battery until all the sulfur or all the polysulfide has been reacted or a prescribed conversion or a prescribed operating time has been achieved. When such a conduit through which sulfur or polysulfide can be conveyed directly from the second store into the third store or from the third store into the second store is not provided, it is necessary, after emptying the second store or third store, for the unreacted polysulfide or the unreacted sulfur to be conveyed back through the cathode space. Interruption of charging operation or discharging operation is made unnecessary thereby since polysulfide continues to be available in the cathode space during charging and sulfur continues to be available in the cathode space during discharging.

The structure according to the invention of the apparatus for storing electric energy makes it possible to control the temperature of the electrochemical cells by means of a sufficiently high flow rate of the sulfur or of the polysulfide through the cathode space. To achieve suitable temperature conditions, it is advantageous here for the second store and the third store each to comprise an apparatus for regulating the temperature. The apparatus for regulating the temperature enables the temperature in the second store and third store to be regulated to a set value. This makes it possible, for example, for heat which has been taken up or released by the sulfur or the polysulfide during passage through the cathode space to be removed or introduced subsequently in the store by means of the apparatus for regulating the temperature, so that the sulfur and/or the polysulfide in the second store or in the third store, preferably in the second store and the third store, can be maintained at a prescribed intended temperature. Any desired apparatus known to those skilled in the art is suitable as apparatus for regulating the temperature. Thus, for example, it is possible to provide a temperature sensor for measuring the temperature and a suitable heating unit and a suitable cooling unit or, as an alternative, a combined heating and cooling unit. To effect heating or cooling, pipes through which, for example, a heat transfer medium flows can be provided in the store or, as an alternative, a double wall through which a heat transfer medium flows can be provided for the store. As an alternative, especially for heating, electric heating elements can also be used. Since the apparatus for storing electric energy is operated at elevated temperature, cooling could also be realized by release of heat into the surroundings.

The number of electrochemical cells which are each connected to a second store and a third store can be as large as desired. Thus, only one electrochemical cell can optionally be provided, but it is also possible to provide up to several thousand electrochemical cells. The number of electrochemical cells is dependent here on the desired electric power of the apparatus for storing electric energy. The individual cells can be electrically connected to one another in series or in parallel. It is also possible to connect in each case a plurality of electrochemical cells in series and connect a plurality of these series in parallel or connect a plurality of electrochemical cells in parallel to form modules and connect the modules respectively connected in parallel in series.

In order to be able to set the temperature of the individual electrochemical cells of an apparatus for storing electric energy, in which molten alkali metal is used as anode material and sulfur is used as cathode material, the apparatus is preferably operated according to a method having the following steps:

(a) passing alkali metal polysulfide through the cathode space in order to charge the apparatus for storing electric energy or passing sulfur through the cathode space in order to discharge the apparatus for storing electric energy, wherein the alkali metal polysulfide from the third store is introduced from below into the cathode space and flows through the cathode space from the bottom upward, wherein part of the alkali metal polysulfide is converted into sulfur and the alkali metal polysulfide and the sulfur are taken off at the top of the cathode space and are introduced into the second store, or the sulfur from the second store is introduced from the top into the cathode space and flows through the cathode space from the top downward, wherein part of the sulfur is converted into alkali metal polysulfide and the sulfur and the alkali metal polysulfide are taken off in the lower region of the cathode space and are introduced into the third store, (b) reversing the flow direction and conveying the alkali metal polysulfide from the second store back into the third store during the charging process and conveying the sulfur from the third store back into the second store during the discharging process, (c) repeating the steps (a) and (b).

The introduction of the alkali metal sulfide from below into the cathode space and the taking-off of the sulfur formed during passage through the cathode space and also of the unreacted alkali metal polysulfide from the cathode space at the top, or the introduction of the sulfur from above into the cathode space and the taking-off of the alkali metal polysulfide formed in the cathode space and also of the unreacted sulfur from the cathode space at the bottom assist utilization of the density difference between sulfur and alkali metal polysulfide. The alkali metal polysulfide has a greater density than the sulfur and thus sinks downward, while sulfur formed during charging of the apparatus has a lower density and thus rises. Since taking-off is effected at the bottom during discharging and at the top during charging, the alkali metal polysulfide, in particular, is also removed from the cathode space during the discharging process, so that it does not block the further reaction at the electrode. The method allows fresh sulfur always to be introduced and flow to the electrode during discharging. Correspondingly, the sulfur formed, in particular, is also removed from the cathode space during charging of the apparatus, so that further alkali metal polysulfide introduced comes into contact with the electrode and is converted into alkali metal, which is conveyed through the solid electrolyte, and sulfur. These flow conditions make it possible, in contrast to the batteries based on alkali metal and sulfur which are known from the prior art, to use a simple, flat electrode since this does not have to have a storage function. Furthermore, the space around the electrode also has to be only of such a size that no droplets continue to hang. Here too, no additional storage volume is required. Since the cathode space does not have a storage function and, in addition, the electrode can be made flat and without a storage function, it is possible to accommodate a larger number of cells in the same volume of the apparatus for storing electric energy than in the case of the cell configurations known from prior art.

When the second store and the third store are connected to one another so that liquid can be conveyed directly from the second store into the third store or conversely liquid can be conveyed from the third store directly into the second store, it is possible to open the corresponding connection before carrying out step (b), so that when the flow direction is reversed, the alkali metal polysulfide or the sulfur is conveyed via the direct connection into the other store. However, if such a conduit is not provided, it is also possible, after reversal of the flow direction, for the alkali metal polysulfide or the sulfur to be conveyed through the cathode space back into the respective other store, with in this case the operation of the apparatus for storing electric energy, i.e. either charging or discharging, being able to be continued until the polysulfide present in the cathode space during charging or the sulfur present in the cathode space during discharging has been reacted at the electrode.

To avoid interruption during charging operation or during discharging operation when in step (b) the alkali metal or the sulfur is recirculated, it is preferred if, in each case before carrying out step (a), the sulfur from the third store is conveyed through the cathode space into the second store during charging of the apparatus and the alkali metal polysulfide from the second store is conveyed through the cathode space into the third store during discharging of the apparatus, in each case at a rate which is greater than the rate at which the alkali metal polysulfide is conveyed through the cathode space during charging and the sulfur is conveyed through the cathode space during discharging.

The above-described process in which the sulfur is conveyed back into the second store during discharging or the alkali metal is conveyed back into the third store during charging is particularly suitable in the case of a structure of the apparatus for storing electric energy in which the second store is positioned above the electrochemical cell and the third store is positioned below the electrochemical cell. This structure has the additional advantage that the electrochemical cell can be completely emptied under the action of gravity alone even when there is a failure of energy supply, so that no material can solidify around the solid electrolyte and thus damage the solid electrolyte or the electrode.

When the second and third stores used are each provided with offtake points both for sulfur and for polysulfide, wherein the offtake for sulfur can be realized, for example, by means of a float which rests on the liquid surface and the offtake point for polysulfide is on the underside of the store, it is possible, both during charging and during discharging, for the polysulfide or alternatively the sulfur firstly to be conveyed from the second store into the third store and, as soon as a prescribed state has been reached, in the reverse direction from the third store into the second store. The corresponding method then comprises the following steps:

(i) passing alkali metal polysulfide through the cathode space in order to charge the apparatus for storing electric energy or passing sulfur through the cathode space in order to discharge the apparatus for storing electric energy, wherein the alkali metal polysulfide or the sulfur flows from the second store into the third store and part of the sulfur is converted into alkali metal polysulfide during passage through the cathode space during discharging and part of the alkali metal polysulfide is converted into sulfur during passage through the cathode space during charging, so that an upper liquid phase composed of sulfur and a lower liquid phase composed of alkali metal polysulfide are comprised in the third store after passage through the cathode space;

(ii) reversing the flow direction after at least part of the sulfur or at least part of the alkali metal polysulfide has been taken off from the second store;

(iii) passing alkali metal polysulfide through the cathode space in order to charge the apparatus for storing electric energy or passing sulfur through the cathode space in order to discharge the apparatus for storing electric energy, wherein the alkali metal polysulfide or the sulfur flows from the third store into the second store and part of the sulfur is converted into alkali metal polysulfide during passage through the cathode space during discharging and part of the alkali metal polysulfide is converted into sulfur during passage through the cathode space during charging, so that an upper liquid phase composed of sulfur and a lower liquid phase composed of alkali metal polysulfide are comprised in the second store after passage through the cathode space, or direct conveying of the contents of the third store back into the second store;

(iv) reversing the flow direction after at least part of the sulfur or part of the alkali metal polysulfide has been taken off from the third store;

(v) repeating the steps (i) to (iv), wherein the alkali metal polysulfide is introduced in such a way that it flows from the bottom upward through the cathode space during charging and the sulfur is introduced in such a way that it flows from the top downward through the cathode space during discharging.

The prescribed state at which, when it is attained, the conveying direction is to be reversed is, for example, a prescribed amount or a prescribed time, with the amount or time being able to be selected as desired. However, the conveying direction has to be reversed at the latest when all the sulfur or all the polysulfide has been taken off from a store.

Both in the method variant in which the flow direction is reversed after passage through the cathode space and the contents of the one store are conveyed back into the other, wherein the recirculation occurs at a higher rate through the cathode space or alternatively via a separate conduit, and in the method variant in which flow through the cathode space occurs alternately from the second to the third store and from the third to the second store, it is possible to use very much larger amounts of alkali metal and sulfur as a result of the use of separate stores and thus increase the range of the battery.

In one possible embodiment, the third store is configured as an intermediate store and can have a smaller volume than the second store. In this case in particular, the above-described method is, in step (iii), carried out in such a way that, after reversal of the flow direction, the contents of the third store are conveyed directly back into the second store.

Both the above-described method having the steps (a) to (c) and the method having the steps (i) to (v) are each operated in such a way that the flow rate through the cathode space during charging or discharging of the apparatus for storing electric energy is so great that only part of the sulfur introduced or of the polysulfide introduced is reacted. This means that the polysulfide is conveyed in excess through the cathode space during charging and the sulfur is conveyed in excess through the cathode space during discharging. The excess of polysulfide during charging and the excess of sulfur during discharging are preferably at least one and a half times the stoichiometrically required amount. The maximum excess of polysulfide or sulfur is preferably the amount which can be conveyed at a pressure difference of 10 bar between the second and the third store. The maximum amount which is transported is also determined by the configuration of the cathode space. It is necessary for the amount required for operation of the electrochemical cell to be reacted in the cathode space and, in addition, for the cathode space, in particular the electrode accommodated therein and the solid electrolyte, not to be damaged by the flow.

To prevent conveying apparatuses from coming into contact with the sulfur or the polysulfide, it is preferred if the conveying of the sulfur or of the alkali metal polysulfide is effected by conveying the gas from the store which is being filled into the store which is being emptied. Since the stores have a constant volume, these always also comprise gas in addition to the sulfur and/or polysulfide. The gas comprised in the stores is preferably inert toward the materials used. Suitable gases are, for example, nitrogen, helium, argon or other gases which are inert toward sulfur and polysulfide.

The transport of the polysulfide or of the sulfur is here effected by gas being introduced into the store to be emptied, so that the pressure is increased in the store. The gas is taken off from the store to be filled. The transport of the sulfur or of the polysulfide is thus carried out under pressure control without a conveying apparatus having to be provided in the conduits through which the sulfur and/or polysulfide flow(s). Only compressors which convey the gas from one store into the other store are present.

Since heat is taken up during charging of the apparatus and heat is liberated during discharging, it is necessary to control the temperature of the cells. The method according to the invention allows the temperature of the cells to be controlled by passage of the sulfur or polysulfide through the cathode space. For this purpose, the flow rate of the alkali metal polysulfide or of the sulfur is preferably set so that the absolute value of the temperature change of the alkali metal or of the sulfur during passage through the cathode space is less than 40° C. during normal operation of the cells. The heat taken up or released by the sulfur or polysulfide can then be removed or taken up appropriately in the second or third store by regulating the temperatures of the second and third stores and cooling appropriately in the case of a temperature increase and heating in the case of a temperature decrease.

The invention is illustrated below with the aid of examples depicted in the figures.

Figure 2:
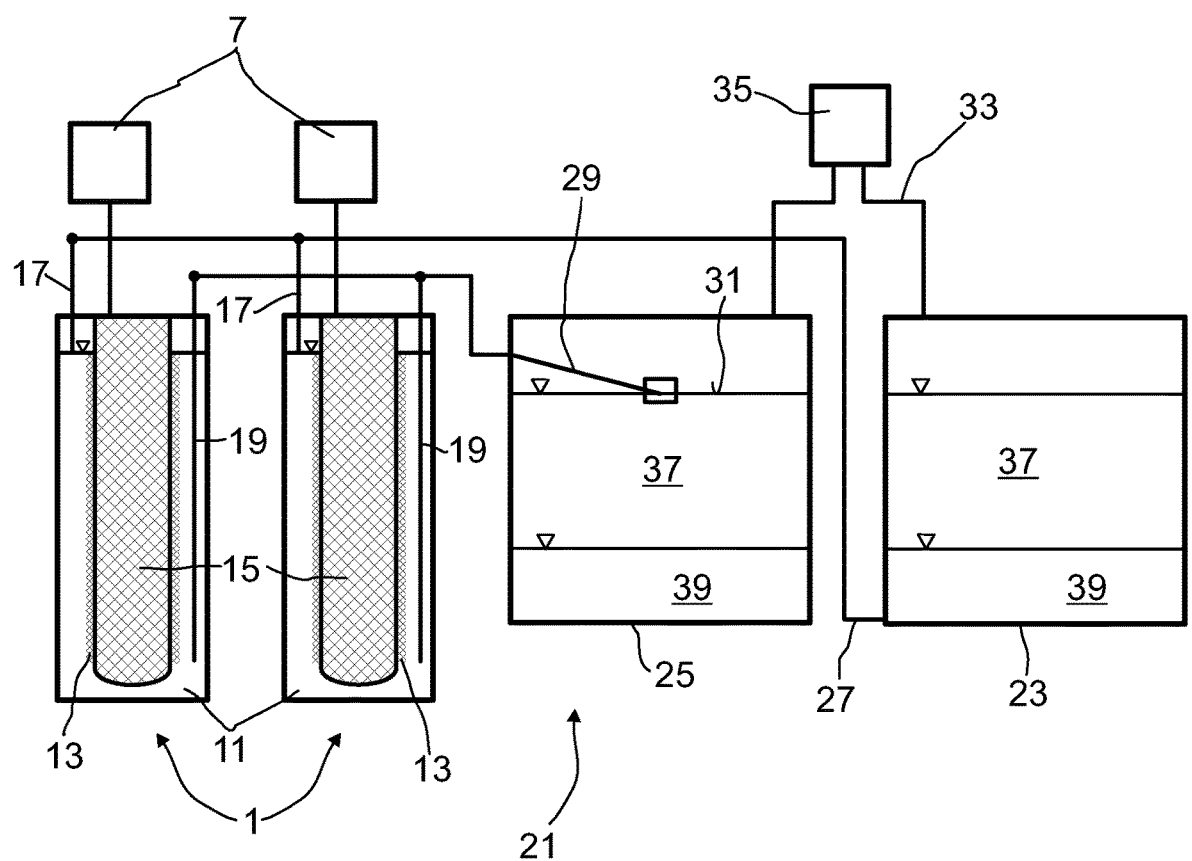
Figure 3:
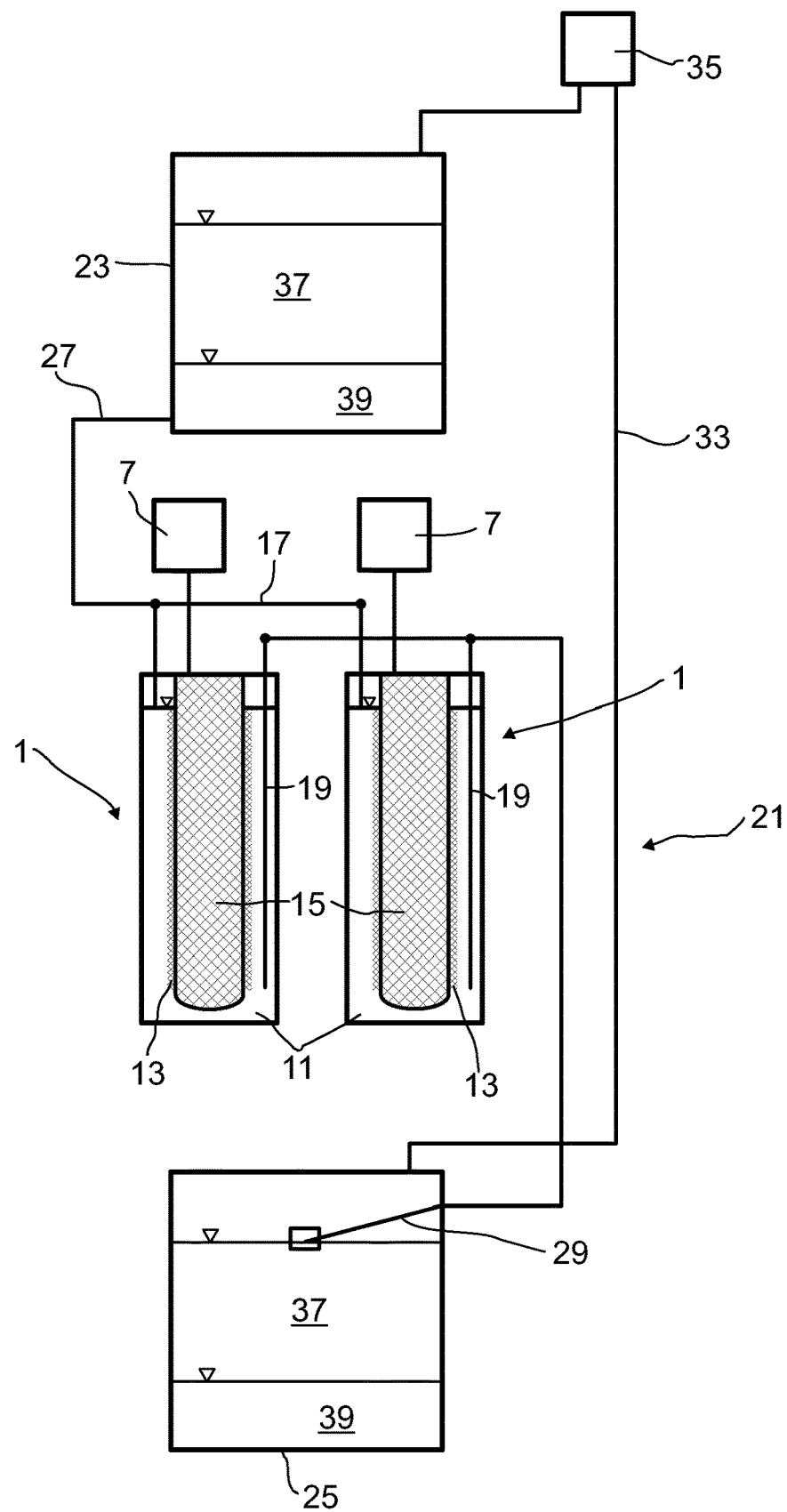
Figure 4:
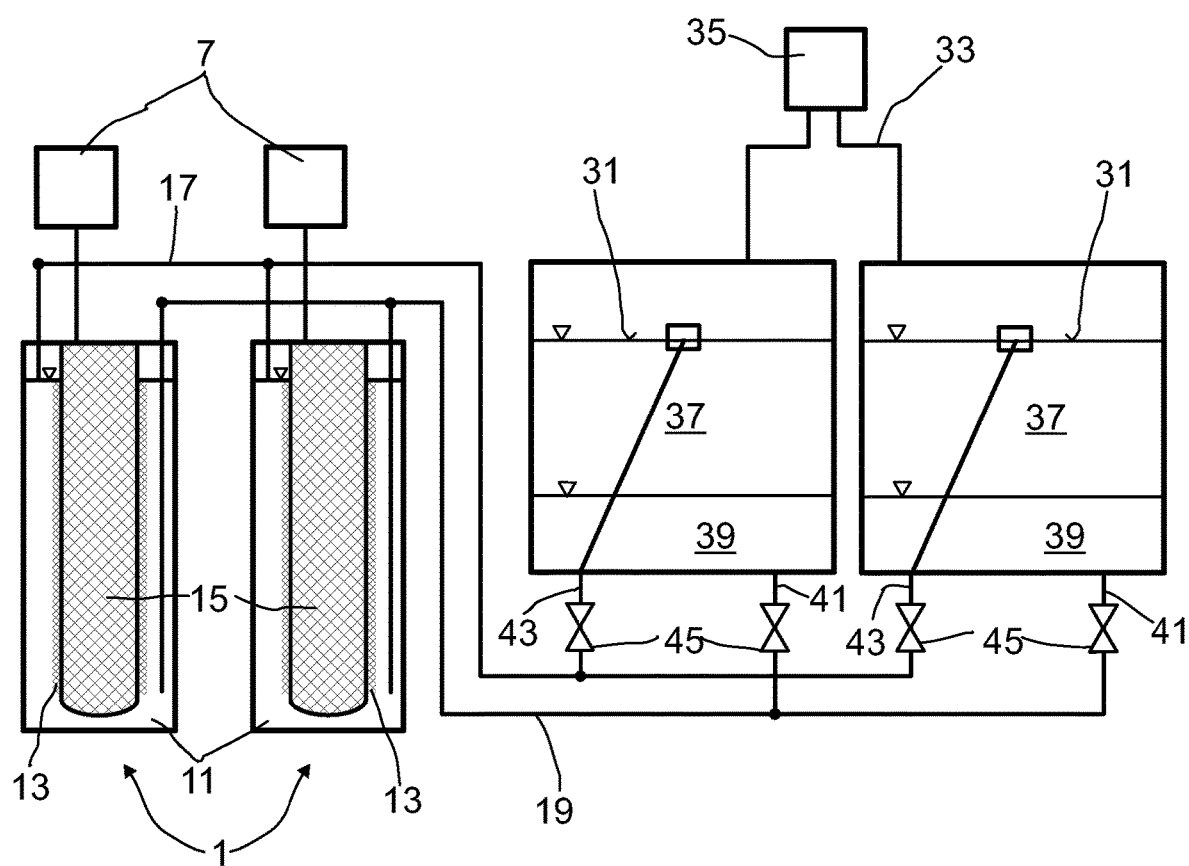
Figure 5:
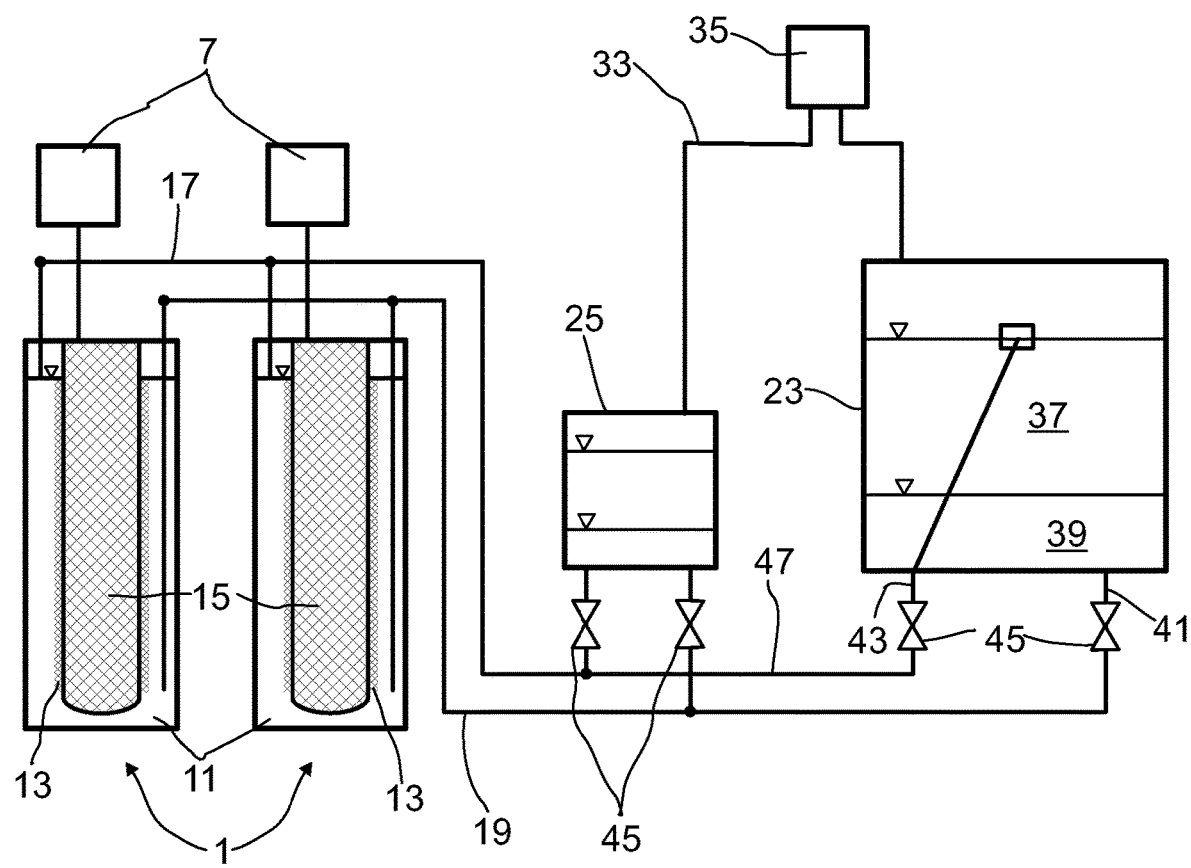

The figures show:

FIG. 1 an electrochemical cell,

FIG. 2 an apparatus for storing electric energy in a first embodiment,

FIG. 3 an apparatus for storing electric energy in a second embodiment,

FIG. 4 an apparatus for storing electric energy in a third embodiment,

FIG. 5 an apparatus for storing electric energy in a fourth embodiment.

FIG. 1 depicts an electrochemical cell.

An electrochemical cell 1 comprises a solid electrolyte 3 which encloses an anode space 5. During operation of the electrochemical cell 1, the anode space 5 is filled with anode material. The anode space 5 enclosed by the solid electrolyte 3 is connected to a first store 7 for anode material in order to increase the capacity of the electrochemical cell 1.

The solid electrolyte 3 is accommodated in a housing 9, with a cathode space 11 surrounding the solid electrolyte 3 and being bounded by the housing 9. During operation of the electrochemical cell, either cathode material or reaction product of cathode material with anode material flows through the cathode space 11 surrounding the solid electrolyte 3. The size of the cathode space 11 surrounding the solid electrolyte 3 is selected so that the desired capacity of the electrochemical cell 1 is achieved.

To ensure the function of the electrochemical cell 1, the solid electrolyte 3 is enclosed by a porous electrode 13. The electrochemical cell 1 serves, in particular, as store for electric energy. To obtain the electric energy, the anode material reacts with the cathode material. This reaction occurs in the porous electrode 13. For the reaction to be able to take place, it is necessary for the solid electrolyte to be permeable to ions of the anode material, preferably alkali metal ions and in particular sodium ions. The alkali metal used as anode material reacts with the sulfur which is preferably used as cathode material to form alkali metal polysulfide, for the purposes of the present invention also referred to as polysulfide.

The electrical connection of the electrochemical cell 1 is effected, as is known to those skilled in the art, via collectors (which are not shown here), with one collector usually being connected to the porous electrode 13 and a second collector to the electrically conductive anode material.

In a preferred embodiment, a displacement body 15 is accommodated in the anode space 5 enclosed by the solid electrolyte 3. The displacement body 15 reduces the volume of the anode space 5. This results in an improvement in the operational safety of the electrochemical cell 1 since the proportion of anode material which can react in an uncontrolled manner in the case of rupture of the solid electrolyte is greatly reduced.

The displacement body 15 can be configured as a solid element or as a hollow body. When the displacement body 15 is configured as a hollow body, it is possible for a heat transfer medium to flow through this body in order to achieve additional control of the temperature of the electrochemical cell.

In order to be able to operate the electrochemical cell 1, a first conduit 17 and a second conduit 19 are comprised, with the first conduit 17 opening into the top of the cathode space 11 and the second conduit 19 opening into the bottom.

During discharging, sulfur is fed in via the first conduit 17 and alkali metal polysulfide formed and unreacted sulfur are taken off via the second conduit 19. For charging, the flow direction is reversed, so that in this case alkali metal polysulfide is fed in via the second conduit 19 and sulfur formed in the cathode space 11 and unreacted alkali metal polysulfide are taken off via the first conduit 17.

FIG. 2 shows an apparatus for storing electric energy in a first embodiment.

An apparatus for storing electric energy 21 generally comprises a plurality of electrochemical cells 1. Here, two electrochemical cells 1 are depicted by way of example. The number of electrochemical cells can usually be in the range from 1 to several hundred thousand.

In order to obtain a very long time of operation of the apparatus for storing electric energy, a second store 23 and a third store 25 are comprised. The second store 23 has an offtake point 27 in the lower region, with the offtake point 27 being connected to the first conduit 17 which opens into the upper region of the cathode space 11. The third store 25 has an offtake point 29 at the surface 31 of the liquid comprised in the third store 25. The offtake point 29 is connected to the second conduit 19 which opens into the lower region of the cathode space 11. The offtake point 29 at the surface 31 of the liquid in the third store 25 can, for example, be realized by means of a float which floats on the liquid.

The second store 23 and the third store 25 are additionally connected to one another by a gas conduit 33. The gas conduit 33 in each case opens into the upper region of the second store 23 and of the third store 25. In this way, the gas-comprising regions of the second store 23 and of the third store 25, which are in each case located above the liquid, are connected to one another. The gas conduit particularly preferably opens, as shown here, at the lid of the second store 23 and of the third store 25.

A conveying apparatus having a reversible conveying direction 35, by means of which gas can either be conveyed from the second store 23 into the third store 25 or, conversely, from the third store 25 into the second store 23, is accommodated in the gas conduit 33. As conveying apparatus having a reversible conveying direction, it is possible to use any desired conveying apparatus known to those skilled in the art which makes a reversible conveying direction possible. Thus, it is possible, for example, to use a compressor whose conveying direction is reversible. As an alternative, it is also possible to provide two conduits, with a compressor being accommodated in each conduit and conveying occurring through one conduit from the second store 23 into the third store 25 and through the second conduit from the third store 25 into the second store 23. For this purpose, the conduit corresponding to the direction in which conveying is to take place is in each case opened. Appropriate valves, for example, can be used for this purpose.

To charge the apparatus for storing electric energy 21, gas is conveyed from the second store 23 via the gas conduit 33 into the third store 25 by means of the conveying device 35. As a result, an elevated pressure is established in the third store 25. Owing to the elevated pressure, sulfur, which forms an upper liquid phase 37, is firstly pushed into the offtake point 29 in the third store and conveyed through the cathode space 11 of the electrochemical cells 1 into the second store 23. As soon as the sulfur has been taken off from the third store 25, the offtake point 29 rests on the alkali metal polysulfide comprised as lower liquid phase 39 in the third store, so that this alkali metal polysulfide is taken off via the offtake point 29 and is conveyed through the cathode space 11 of the electrochemical cell 1. A voltage is applied to the electrochemical cell so that part of the alkali metal polysulfide which comes into contact with the electrode 13 reacts to form alkali metal and sulfur. The alkali metal is discharged through the solid electrolyte 3 into the anode space 5 and from there into the first store 7 and the sulfur formed is pushed together with the unreacted alkali metal polysulfide from the cathode space 11 through the first conduit 17 into the second store 23. Thus, an upper liquid phase composed of sulfur and a lower liquid phase composed of alkali metal polysulfide are formed in the second store.

As soon as a certain amount of polysulfide has been conveyed out of the third store 25, the conveying direction of the conveying apparatus 35 having a reversible conveying direction is reversed. Gas is now conveyed from the third store 25 into the second store 23, so that the pressure in the second store 23 rises and the polysulfide comprised in the second store 23 is taken off via the offtake point 27 at the bottom of the second store 23 and conveyed through the cathode space 11 back into the second store 23. The conveying from the second store 23 into the third store 25 is stopped as soon as all the polysulfide has been taken off from the second store 23. This point in time is determined by means of suitable measurement facilities, for example by measurement of the thermal or electrical conductivity, the density or the viscosity of the liquid present at the bottom of the second store 23 or in the conduit 17. The conveying direction of the gas is subsequently reversed again. The polysulfide is then again conveyed through the cathode space 11 by introducing the gas from the second store 23 into the third store 25, with part of the polysulfide being reacted to form alkali metal and sulfur.

During conveying of the polysulfide from the second store 23 into the third store 25, it is likewise possible for part of the polysulfide to be converted into sulfur and alkali metal. The sulfur produced in this way initially remains in the cathode space 11. When the conveying direction is reversed again and polysulfide is again conveyed from the third store 25 through the conduit 19 into the cathode space 11, this sulfur is conveyed back into the second store 23.

The above steps are repeated, at a maximum, until all the polysulfide has been converted into sulfur. As soon as all the polysulfide has been reacted, the battery is charged and the stored electric energy can be utilized. For this purpose, the residues of polysulfide and then the sulfur are, in a first step, conveyed from the second store 23 through the cathode space 11 into the third store 25 by introducing gas from the third store 25 into the second store 23. After the polysulfide still comprised in the second store 23 has been conveyed through the cathode space 11, the sulfur goes into the cathode space 11, with part of the sulfur being reacted with the alkali metal from the anode space 5 to form alkali metal polysulfide in the electrode 13. The polysulfide formed and the unreacted sulfur are conveyed through the second conduit 19 into the third store 25. After a certain time, but at the latest when the second store 23 has been emptied, the conveying direction is reversed on the conveying apparatus 35, so that the gas is conveyed from the second store 23 into the third store 25. This leads to the sulfur being conveyed from the third store 25 into the second store 23. As soon as the sulfur has been taken off from the third store 25 and only polysulfide is still comprised therein, the conveying direction of the gas is reversed again and the process starts afresh. This point in time is determined by means of suitable measurement facilities, for example by measurement of the thermal or electrical conductivity, the density or viscosity of the liquid present in the offtake facility 29 at the third store 25 or in the conduit 19. This is repeated until all the sulfur has been reacted and the apparatus is thus discharged.

Here too, it is possible for sulfur in the cathode space 11 to be converted into alkali metal polysulfide during recirculation of the sulfur. In this case, the polysulfide formed remains in the cathode space 11. When the conveying direction is reversed again and sulfur is conveyed from the second store 23 into the cathode space 11, the polysulfide comprised in the cathode space 11 firstly flows into the third store 25.

An alternative structure for an apparatus for storing electric energy, which is operated in the same way as the apparatus depicted in FIG. 2, is shown in FIG. 3.

The embodiment depicted in FIG. 3 differs from that shown in FIG. 2 in terms of the position of the second store 23 and of the third store 25.

In the embodiment shown in FIG. 3, the second store 23 is positioned above the electrochemical cells 1 and the third store 25 is positioned below the electrochemical cells 1. This has the advantage that continued emptying of the electrochemical cells is possible even in the event of a failure of energy supply. The contents of the electrochemical cells 1 can run solely under the action of gravity into the third store 25. This makes it possible to prevent sulfur or polysulfide from solidifying in the electrochemical cell after shutdown and possibly damaging the electrode 13 or in particular the solid electrolyte 3.

However, in the embodiment shown in FIG. 3, a higher gas pressure than in the embodiment shown in FIG. 2 is necessary in order to convey the contents of the third store 25 back into the second store 23 because of the position of the second store 23.

FIG. 4 shows an apparatus for storing electric energy in a third embodiment.

The embodiment shown in FIG. 4 differs from that shown in FIG. 2 in the arrangement of the offtake points on the second store 23 and third store 25 and also the conduits 17, 19 which are connected to the respective offtake points and via which the second store 23 and third store 25 are connected to the cathode space 11.

In the embodiment shown in FIG. 4, both the second store 23 and the third store 25 have an offtake point 41 in the lower region, with the offtake points 41 each being connected to the second conduit 19 which ends in the lower region of the cathode space 11. Furthermore, the second store 23 and the third store 25 each have an offtake point 43 which is arranged at the surface of the liquid in the respective store 23, 25. The offtake points 43 which are arranged at the surface of the liquid in the respective store 23, 25 are each connected to the first conduit 17 which ends in the upper region of the cathode space 11.

Both the offtake points 41 which are arranged in the lower region of the stores 23, 25 and the offtake points 43 which are arranged at the surface of the liquid in the stores 23, 25 can be closed by means of suitable closure elements 45. Here, it is possible to use, for example, sliding valves, rotating ball valves or other devices known to those skilled in the art as closure element 45.

After discharging or start-up of the apparatus as shown in FIG. 4, alkali metal polysulfide is present in the second store 23 and the third store 25 is empty. However, it is also possible for polysulfide to be present in each of the two stores 23, 25. To effect the charging, the alkali metal polysulfide is taken off from the second store 23 via the offtake conduit 41 and conveyed through the second conduit 19 into the cathode space 11. In the cathode space 11, part of the alkali metal polysulfide is reacted at the electrode 13 to form sulfur and alkali metal and the alkali metal is transported through the solid electrolyte 3 into the anode space 5. Since further alkali metal always gets into the anode space 5, the pressure increases here and the alkali metal is thereby transported into the store 7.

The sulfur and the unreacted polysulfide are taken off from the top of the cathode space 11 via the first conduit 17 and introduced into the third store 25. For this purpose, the closure element at the offtake point 41 at the bottom of the store is opened at the second store 23 from which the polysulfide is taken off, and the closure element at the offtake point 43 arranged at the surface of the liquid is closed. Correspondingly, the closure element 45 at the offtake point 41 arranged at the bottom of the store is closed at the third store 25 into which the sulfur and the unreacted polysulfide are introduced, and the closure element 45 at the offtake point arranged at the surface of the liquid is opened. In the embodiment shown here, too, to take the polysulfide off from the second store 23, gas from the third store 25 is introduced via the gas conduit 33 into the second store 23, so that the pressure in the second store 23 rises and the polysulfide is pushed out of the store via the offtake point 41.

When a predetermined amount has been attained or when all the polysulfide has been taken off, i.e. the phase boundary between polysulfide and sulfur has reached the offtake point 41, the closure elements at the offtake conduit 41 of the second store 23 and at the offtake conduit 43 at the third store 25 are closed and the respective other closure element 45 is opened, so that the polysulfide can now be taken off from the third store 25, into which the sulfur and the unreacted polysulfide have previously been introduced, and the sulfur formed and the unreacted polysulfide can, after flowing through the cathode space 11, be introduced into the second store 23. To effect the corresponding transport, the conveying direction of the conveying element 35 having a reversible conveying direction is at the same time reversed, so that gas from the second store 23 is introduced into the third store 25 in order to realize pressure-driven liquid transport. After a predetermined amount has been reached, the conveying direction is reversed again and the respective closure elements which were open are closed and the closure elements which were closed are opened. This process is repeated, at a maximum, until all of the polysulfide has been converted into sulfur.

The discharging of the apparatus in order to utilize the electric energy is carried out analogously to the charging process, with the difference that in order to take off the sulfur, the closure element 45 at the offtake point 43 which is arranged at the surface of the liquid is opened and, to introduce the polysulfide and the unreacted sulfur into the store, the closure element 45 at the offtake point 41 at the bottom of the store is opened and the closure element 45 at the offtake point 43 at the surface of the liquid is closed. After a predetermined time has elapsed or a predetermined amount of sulfur has been taken off or all the sulfur has been taken off, the conveying direction is reversed.

A further embodiment of an apparatus for storing electric energy is shown in FIG. 5.

In contrast to the embodiment shown in FIG. 4, the second store 23 here is a large store and the third store 25 is a small intermediate store. The third store 25 is connected by means of a direct conduit 47 to the second store 23. In contrast to the operation of the embodiment shown in FIG. 4, here the entire contents of the third store 25 are conveyed back through the direct conduit 47 into the second store 23 when the amount at which the conveying direction is reversed has been attained. A corresponding way of carrying out the method, in which the liquid from the third store 25 is conveyed back into the second store 23 via a direct conduit, is also possible in the case of the embodiment shown in FIG. 4 having equal-sized stores.

In all embodiments, the second conduit 19, which ends in the lower region of the cathode space, is configured, for example, as an immersed tube which projects into the cathode space 11. As an alternative, it is of course also possible to join the second conduit 19 on to the cathode space from the bottom by means of a suitable connection. However, the second conduit is, as depicted here, preferably an immersed tube.

In all embodiments, transport of the liquid, i.e. of the sulfur and of the polysulfide, is effected by taking off gas from the store into which the liquid is introduced and conveying it via the gas conduit 33 into the store from which the liquid is taken off. This makes it possible to realize transport of sulfur and polysulfide without a conveying apparatus, for example a pump, coming into contact with sulfur or polysulfide.

To prevent sulfur vapors comprised in the gas from damaging the conveying apparatus 35 having a reversible conveying direction, condensate separators (not shown here) are preferably provided. In the condensate separator, the gas is cooled so that the sulfur condenses out. The condensed sulfur can then be removed from the gas, so that the conveying apparatus 35 does not come into contact with sulfur.

In order to control the temperature of the electrochemical cells 1, the flow rate at which the polysulfide or the sulfur is conveyed through the cathode space 11 is so great that only part of the sulfur is reacted during discharging or part of the polysulfide is reacted during charging. The flow rate is preferably made so great that the temperature of the polysulfide or of the sulfur on introduction into the cathode space 11 deviates by less than 40° C., preferably less than 10° C., from the temperature of the sulfur and the unreacted polysulfide or the polysulfide and the unreacted sulfur when taken off from the cathode space 11. To keep the temperature in the electrochemical cell 1 constant here during multiple passes through the cathode space 11, the temperatures of the second store 23 and of the third store 25 are preferably controlled.

Furthermore, preference is given to all components, except for the conveying apparatus 35 for the gas, to be enclosed by insulation, which is not shown here in the figures. Here, the components can in each case be provided separately with insulation or joint insulation for all components is utilized. Furthermore, it is possible here for the entire apparatus for storing electric energy to be accommodated in an overall container and for the overall container to be provided with the insulation.

LIST OF REFERENCE NUMERALS

1 electrochemical cell
3 solid electrolyte
5 anode space
7 first store
9 housing
11 cathode space
13 porous electrode
15 displacement body
17 first conduit
19 second conduit
21 apparatus for storing electric energy
23 second store
25 third store
27 offtake point at the bottom of the second store 23
29 offtake point in the third store 25
31 surface of the liquid in the third store 25
33 gas conduit
35 conveying apparatus having a reversible conveying direction
37 upper liquid phase
39 lower liquid phase
41 offtake point at the bottom of the store
43 offtake point at the surface of the liquid
45 closure element
47 direct conduit

The invention claimed is:

1. An apparatus for storing electric energy comprising:
   at least one electrochemical cell having an anode space and a cathode space that are separated by a solid electrolyte;
   a first store for anode material that is connected to the anode space; and
   a second store for cathode material that is connected to the cathode space, wherein the anode material, the cathode material, and a reaction product formed in the cathode space are liquid at operating temperature, the cathode material and the reaction product form two immiscible phases having different densities, the cathode space is also connected to a third store, and the second store and the third store are connected to one another by means of a gas conduit,
   wherein the gas conduit opens in each case into an upper region of the second store and of the third store, and a conveying apparatus for gas having a reversible conveying direction is accommodated in the gas conduit, and wherein
   (i) the second store has an offtake point in a lower region of the store that is connected to a conduit that opens into an upper region of the cathode space, and the third store has an offtake point at a surface of a liquid comprised in the third store that is connected to a conduit that opens into a lower region of the cathode space, or
   (ii) the second store and the third store each have an offtake point in the lower region of the respective store, and the offtake points are connected to a conduit that opens into the lower region of the cathode space, and each have an offtake point at the surface of the liquid comprised in the respective store, and the offtake points are connected to a conduit that opens into the upper region of the cathode space.

2. The apparatus according to claim 1, wherein the second store is positioned above the electrochemical cell, and the third store is positioned below the electrochemical cell.

3. The apparatus according to claim 1, wherein the conveying apparatus for the gas having a reversible conveying direction is a compressor unit having a reversible flow direction.

4. The apparatus according to claim 1, wherein a condensate separator is positioned between the second store and the conveying apparatus for gas and/or between the third store and the conveying apparatus for gas.

5. The apparatus according to claim 1, wherein the second store and the third store each have an offtake point in the lower region of the store that are connected to a conduit that opens into the lower region of the cathode space, and each have an offtake point at the surface of the liquid comprised in the store that are connected to a conduit that opens into the upper region of the cathode space, and the second store and third store are connected to one another in such a way that liquid from the second store can be conveyed directly into the third store.

6. The apparatus according to claim 1, wherein the second store or the third store or the second store and the third store each comprise an apparatus for regulating the temperature.

7. A method of operating an apparatus for storing electric energy according to claim 1, wherein a molten alkali metal is used as an anode material and sulfur is used as a cathode material, the method comprising the following steps:
(a) passing alkali metal polysulfide through the cathode space in order to charge the apparatus for storing electric energy or passing sulfur through the cathode space in order to discharge the apparatus for storing electric energy, wherein the alkali metal polysulfide from the third store is introduced from below into the cathode space and flows through the cathode space from the bottom upward, wherein part of the alkali metal polysulfide is converted into sulfur, and the alkali metal polysulfide and the sulfur are taken off at the top of the cathode space and are introduced into the second store, or the sulfur from the second store is introduced from the top into the cathode space and flows through the cathode space from the top downward, wherein part of the sulfur is converted into alkali metal polysulfide and the sulfur and the alkali metal polysulfide are taken off in the lower region of the cathode space and are introduced into the third store,
(b) reversing the flow direction and conveying the alkali metal polysulfide from the second store back into the third store during the charging process and conveying the sulfur from the third store back into the second store during the discharging process, and
(c) repeating the steps (a) and (b).

8. The method according to claim 7, wherein, in each case before carrying out step (a), the sulfur from the third store is conveyed through the cathode space into the second store during the charging of the apparatus, and the alkali metal polysulfide from the second store is conveyed through the cathode space into the third store during the discharging of the apparatus, in each case at a rate that is greater than the rate at which the alkali metal polysulfide is conveyed through the cathode space during the charging and the sulfur is conveyed through the cathode space during the discharging.

9. A method of operating an apparatus for storing electric energy according to claim 5, wherein a molten alkali metal is used as an anode material and sulfur is used as a cathode material, the method comprising the following steps:
(i) passing alkali metal polysulfide through the cathode space in order to charge the apparatus for storing electric energy or passing sulfur through the cathode space in order to discharge the apparatus for storing electric energy, wherein the alkali metal polysulfide or the sulfur flows from the second store into the third store, and part of the sulfur is converted into alkali metal polysulfide during passage through the cathode space during discharging and part of the alkali metal polysulfide is converted into sulfur during passage through the cathode space during charging, so that an upper liquid phase composed of sulfur and a lower liquid phase composed of alkali metal polysulfide are comprised in the third store after passage through the cathode space;
(ii) reversing the flow direction after at least part of the sulfur or at least part of the alkali metal polysulfide has been taken off from the second store;
(iii) passing alkali metal polysulfide through the cathode space in order to charge the apparatus for storing electric energy or passing sulfur through the cathode space in order to discharge the apparatus for storing electric energy, wherein the alkali metal polysulfide or the sulfur flows from the third store into the second store and part of the sulfur is converted into alkali metal polysulfide during passage through the cathode space during discharging and part of the alkali metal polysulfide is converted into sulfur during passage through the cathode space during charging, so that the upper liquid phase composed of sulfur and the lower liquid phase composed of alkali metal polysulfide are comprised in the second store after passage through the cathode space, or direct conveying of the contents of the third store back into the second store;
(iv) reversing the flow direction after at least part of the sulfur or part of the alkali metal polysulfide has been taken off from the third store; and
(v) repeating the steps (i) to (iv),
wherein the alkali metal polysulfide is introduced in such a way that it flows from the bottom upward through the cathode space during charging and the sulfur is introduced in such a way that it flows from the top downward through the cathode space during discharging.

10. The method according to claim 9, wherein the conveying of the sulfur or of the alkali metal polysulfide is effected by conveying the gas from the store which that is being filled into the store that is being emptied.

11. The method according to claim 9, wherein the flow rate of the alkali metal polysulfide or of the sulfur is set so that an absolute value of a temperature change of the alkali metal or of the sulfur during passage through the cathode space is less than 40° C. during normal operation of the electrochemical cells.

12. The method according to claim 9, wherein the alkali metal is sodium.

13. The method according to claim 7, wherein the conveying of the sulfur or of the alkali metal polysulfide is effected by conveying the gas from the store that is being filled into the store that is being emptied.

14. The method according to claim 7, wherein the flow rate of the alkali metal polysulfide or of the sulfur is set so that an absolute value of the temperature change of the alkali metal or of the sulfur during passage through the cathode space is less than 40° C. during normal operation of the electrochemical cells.

15. The method according to claim 7, wherein the alkali metal is sodium.

* * * * *